Dec. 4, 1956 J. B. SINGEL 2,773,181

FREQUENCY DISCRIMINATOR SYSTEM

Filed Oct. 25, 1951

WITNESSES:
John E. Heasley
Wm. T. Wofford

INVENTOR
John B. Singel.
BY F. E. Browder
ATTORNEY 2,773,181

FREQUENCY DISCRIMINATOR SYSTEM

John B. Singel, Catonsville, Md., assignor to Westinghouse Electric Corporation, East Pittsburgh, Pa., a corporation of Pennsylvania Application October 25, 1951, Serial No. 253,067

8 Claims. (Cl. 250—27)

The present invention relates to discriminator circuits and their application to unmodulated carrier wave systems. The invention has been found to be particularly applicable to receivers used in the power line carrier relaying art.

It is an object of the invention to provide a receiver for unmodulated carrier waves, which includes a relatively simple circuit arrangement for rendering carrier frequency noise voltages ineffective.

Another object of the invention is to provide a receiver for unmodulated carrier waves which will have minimum response to carrier frequency noise voltages while having maximum response to on-frequency signals.

A further object of the invention is to provide a receiver for carrier waves which incorporates a novel discriminator arrangement for cancelling carrier frequency noise voltages.

A further object of the invention is to provide a receiver which incorporates means including a novel arrangement of tuned circuits for giving the receiver a sharp response characteristics for on-frequency signals.

Figure 1:
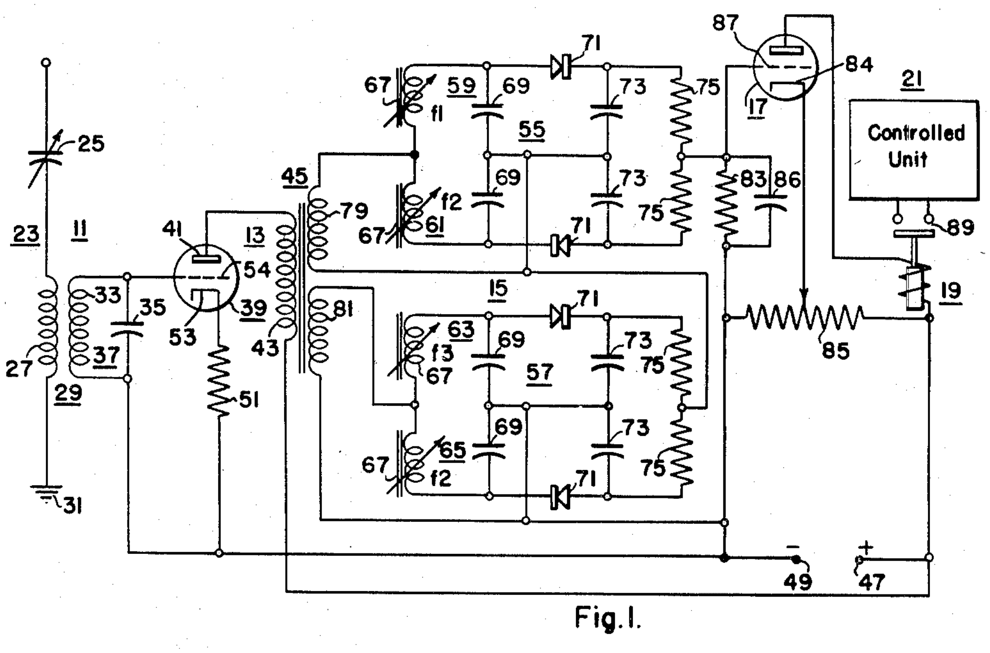
Figure 2:
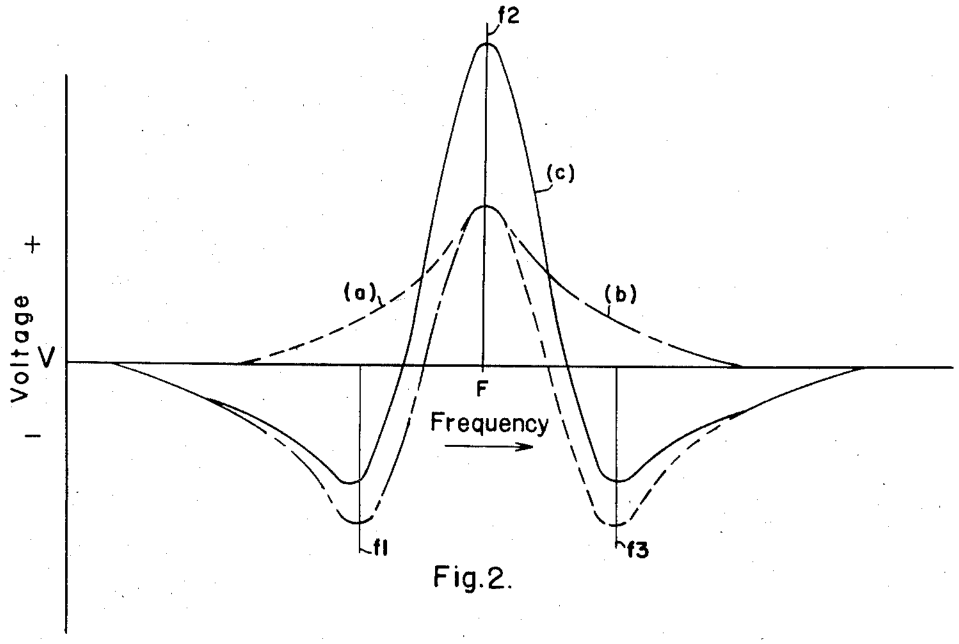

The features of my invention which I consider novel are set forth in the appended claims. The invention, together with the additional objects and advantages thereof, will be understood from the following description of a specific embodiment when read in connection with the accompanying drawing in which:

Figure 1 is a schematic diagram showing a preferred embodiment of the invention, and Fig. 2 is a graph to aid in the explanation of the operation of the invention.

I have chosen to illustrate the principles of the invention by showing its application to a power line carrier relaying receiver. The application of the invention to other types of receivers and electrical apparatus will be obvious to those skilled in the art.

In Figure 1 of the drawing there is shown, in simplified schematic form, a receiver comprising essentially an input circuit 11, a single amplifier stage 13, a discriminator section 15, a relay tube 17, a relay 19, and a controlled unit 21. The receiver input signal may be taken from a power bus, not shown, through a conventional series tuned circuit 23, comprising a variable capacitor 25 and the primary winding 27 of an input transformer 29, to ground 31. The secondary winding 33 of the input transformer is shunted by a capacitor 35 to form a resonant network 37 which is tuned to the frequency of the input signal. The amplifier stage of the receiver is shown simply as a triode 39 having its anode 41 connected in series with the primary winding 43 of an amplifier output transformer 45, to the positive terminal 47 of a potential source, not shown the negative terminal 49 of which is connected through a bias resistor 51 to the cathode 53 of the triode 39. The output of the parallel resonant circuit 37 is applied to the triode 39 between its grid 54 and the negative terminal 49 of the potential source.

The discriminator section of the receiver comprises two identical discriminator units 55, 57. Each discriminator unit 55, 57 includes a pair of series tuned circuits which are connected in shunt with each other. Each series tuned circuit 59, 61, 63, 65 comprises a variable inductance 67 in series with a capacitor 69. An output voltage is taken from the capacitor 69 of each tuned circuit. A detector rectifier 71 is connected in series with a capacitor 73, which we shall call the discriminator output capacitor, across each tuned circuit capacitor 69. A pair of identical resistors 75 are connected in series between the remote terminals of the discriminator output capacitors 73 of each unit 55, 57. The detector rectifiers 71 are poled so that the voltages across the discriminator output capacitors 73 are in additive relation.

The amplifier output transformer 45 has two secondary windings 79, 81. Each secondary winding supplies the amplifier output signal to one of the discriminator units 55, 57, each secondary winding being connected across the tuned circuits of its respective discriminator unit. In the embodiment shown in Figure 1 of the drawing, it will be assumed that the upper tuned circuit 59 of the upper discriminator unit 55 is tuned to a frequency which is below the frequency of the receiver input signal, which latter frequency will be hereinafter referred to as the mean frequency. The upper tuned circuit 63 of the lower discriminator unit 57 is then tuned to a frequency which is above the mean frequency while the lower tuned circuits 61, 65 of both discriminator units are tuned to the mean frequency.

Under the above conditions, a detected voltage, which is a function of the difference between the voltages appearing across the discriminator output capacitors for one discriminator unit, will appear between the junction of the discriminator output capacitors and the junction of the identical series resistors for the unit. This latter voltage will be designated for convenience as the discriminator unit output voltage. The discriminator unit output voltages are added in a circuit including a load resistor 83 shunted by a by-pass capacitor 86. This latter circuit may be traced from the junction of the identical series resistors 75 of the upper discriminator unit 55 to the upper terminal of the load resistor 83, from the lower terminal of the load resistor to the junction of the discriminator output capacitors 73 for the lower unit 57, and from the junction of the identical series resistors 75 for the lower discriminator unit 57 to the junction of the discriminator output capacitors 73 for the upper discriminator unit 55. The voltage appearing across the load resistor 83, which is the total output of the discriminator units 55, 57, is then utilized to operate the load device, which is in the embodiment shown, a relay tube 17. The relay tube is shown as a triode having its anode connected in series with the energizing winding of the relay, to the positive terminal of the power supply. Grid bias for the relay tube 17 is obtained by connection of the relay tube cathode 84 to the movable contact of a potentiometer 85, the end terminals of which are common to the power supply terminals 47, 49. The grid 87 of the relay tube 17 is connected in series with the load resistor 83 to the negative terminal 49 of the power supply. The armature of the relay 19 operates contacts 89 to energize the controlled unit 21. The controlled unit 21 may be desiged to perform any desired function, as is well known in the art, and it therefore deemed unnecessary to show any particular controlled unit in detail herein.

For a further understanding of the principles of my invention, reference is made to the graph of Fig. 2. In the graph of Fig. 2, voltage is plotted as ordinate and frequency as abscissa. Under the condition described above, the lower tuned circuit 61 of the upper discriminator unit 55 is tuned to the mean frequency, and the upper tuned circuit 59 of the upper discriminator unit 55 is tuned to a frequency below the mean frequency. The detected outputs of these tuned circuits, taken over the necessary frequency band, will be a function of the resonant characteristic of the respective tuned circuits. If the detected output characteristic of the lower tuned circuit 61 of the upper discriminator unit 55 is subtracted from the detected output characteristic of the upper tuned circuit 59 of that unit 55, a resultant curve similar to that designated as curve (*a*) of Fig. 2 will result. similarly, if the detected output characteristic of the upper tuned circuit 63 of the lower discriminator unit 57 is substracted from the detected output characteristic of the lower tuned circuit 65 of this unit 57, a curve like that designated curve (*b*) of Fig. 2 will result. If then curves (*a*) and (*b*) of Fig. 2 are added, the result is curve (*c*) of Fig. 2. The discriminator units of the receiver shown in Figure 1 are in fact connected so that the voltage appearing across the load resistor 83 will follow the characteristic shown by curve (*c*) of Fig. 2. If the noise signals, which appear in the receiver input circuit, are evenly distributed over the input frequency band, then they will be totally cancelled out in the receiver discriminator units. Furthermore, the discriminator arrangement shown in Figure 1 results in a sharp on-frequency receiver response characteristic as shown by that part of curve (*c*) of Fig. 2 above the horizontal axis.

In practice, I have found that a receiver incorporating the discriminator arrangement of my invention shows remarkable attenuation to noise signals, while at the same time amplifying the carrier signal. Examination of the curves will show that with the tuned circuits of one discriminator unit tuned to $f_1$ and $f_2$, and the tuned circuits of the other discriminator unit tuned to $f_2$ and $f_3$, the on-frequency $f_2$ signal produces slightly more than three times the (+) driving voltage as an equal single interfering signal at either $f_2$ or $f_3$ would produce. The disadvantage of the negative voltage produced by a single interfering signal is thus reduced by that ratio. This ability to cope with single interfering signals is an additional feature of the receiver primarily intended to minimize the deleterious effects of distributed noise voltages. Furthermore, signals of a frequency producing a negative voltage cannot operate the relay regardless of the magnitude. This feature is particularly useful for signalling purposes, and will give exceptionally good results when used in conjunction with a receiver employing peak limiting or clipping.

While I have shown my invention in only one form, it will be obvious to those skilled in the art that it is not so limited, but is susceptible of various changes and modifications without departing from the spirit thereof.

I claim as my invention:

1. In a frequency selective receiver, the combination comprising a first discriminator unit comprising a pair of tuned circuits one of which is tuned to a mean frequency, the other being tuned to a frequency slightly below the mean frequency, a second discriminator unit comprising a pair of tuned circuits one of which is tuned to said mean frequency, the other being tuned to a frequency slightly above the mean frequency, means for applying an input signal to said discriminators, and means connected to add the outputs of said discriminators in a sense such as will produce a maximum output at said mean frequency.

2. In a frequency selective receiver, the combination comprising four series resonant circuits, two of which are tuned to a mean frequency, a third being tuned to a frequency below said mean frequency, a fourth being tuned to a frequency above said mean frequency, means for applying an input signal simultaneously to each of said circuits, and means for adding the outputs of said circuits in a sense such as will produce a maximum total output at said mean frequency.

3. In a frequency selective receiver, the combination comprising four series resonant circuits, two of which are tuned to a mean frequency, a third being tuned to a frequency below said mean frequency, a fourth being tuned to a frequency above said mean frequency, means for applying an input signal to said circuits, means for deriving a direct current output signal from one element of each said circuit, and means for adding the output signals in a sense such as will produce a maximum total output at said mean frequency.

4. In a frequency selective receiver, the combination comprising four tuned circuits, two of said circuits being tuned to a mean frequency, a third being tuned to a frequency below said mean frequency, and a fourth to a frequency above said mean frequency, means for applying a common input signal to said circuits, means for detecting the output of each of said circuits, and means for adding the detected outputs in a sense such as will produce a maximum output at said mean frequency.

5. In a frequency selective receiver, the combination comprising first, second, third, and fourth tuned circuits, the first circuit being tuned to a frequency above a mean frequency, the third circuit being tuned to a frequency below a mean frequency, the second and fourth circuits being tuned to a mean frequency, means for applying an unmodulated input signal to each said circuits, means for detecting the output of each of said circuits, means for deriving a first voltage proportional to the difference between the detected outputs of said first and second circuits, means for deriving a second voltage which is proportional to the difference between the detected outputs of said third and fourth circuits, and means for adding said first and second voltages.

6. In a frequency selective receiver, the combination comprising first, second, third and fourth tuned circuits each comprising an inductance in series with a capacitor, the first circuit being tuned to a frequency above a mean frequency, the third circuit being tuned to a frequency below said mean frequency, and said second and fourth circuits being tuned to said mean frequency, means connecting said second circuit in shunt with said first circuit, means connecting said fourth circuit in shunt with said third circuit, means for applying an unmodulated input signal across each of said circuits, means for detecting the signal appearing across each said capacitor, means for deriving a voltage proportional to the difference between the detected outputs of said first and second circuits, means for deriving a voltage proportional to the difference between the detected outputs of said third and fourth circuits, and means for adding said voltages to produce a total voltage which is maximum at said mean frequency.

7. In a frequency selective signal receiver, the combination comprising four series tuned circuits the first of which is tuned to a frequency above a mean frequency, the third being tuned to a frequency below a mean frequency, and the second and fourth being tuned to said mean frequency, means connecting said second tuned circuit in shunt with said first tuned circuit, means connecting said fourth tuned circuit in shunt with said third tuned circuit, means for applying a common unmodulated input signal simultaneously to each of said tuned circuits, means for rectifying the signals appearing across the capacitor of each tuned circuit to produce four output voltages, means for deriving a voltage proportional to the difference between the output voltages appearing across the capacitors of said first and second tuned circuits, means for deriving a voltage proportional to the difference between the output voltages appearing across the capacitors of said third and fourth tuned circuits, and means for adding said difference voltages to produce a total voltage which is maximum at said mean frequency.

8. In a frequency selective receiver, the combination comprising a first discriminator unit of the frequency modulation detector type, including a pair of tuned circuits and rectifying means, one of said tuned circuits being tuned to a mean frequency, the other being tuned to a frequency slightly below the mean frequency, a second discriminator unit of the frequency modulation detector type, including a pair of tuned circuits and rectifying means, one of said tuned circuits being tuned to said mean frequency, the other being tuned to a frequency slightly above the mean frequency, means for applying unmodulated common input signals to said discriminators, and means for adding the outputs of said discriminators in a sense such as will produce a maximum output at said mean frequency.

References Cited in the file of this patent

UNITED STATES PATENTS

| | | |
|---|---|---|
| 1,606,807 | Riegger | Nov. 16, 1926 |
| 1,697,512 | Paust | Jan. 1, 1929 |
| 1,703,171 | Purington | Feb. 26, 1929 |
| 2,097,937 | Rust | Nov. 2, 1937 |
| 2,422,083 | Crosby | June 10, 1947 |
| 2,461,956 | Beckwith | Feb. 15, 1949 |
| 2,561,088 | Anderson | July 17, 1951 |
| 2,569,000 | Hadfield | Sept. 25, 1951 |
| 2,589,236 | Earp | Mar. 18, 1952 |

FOREIGN PATENTS

| | | |
|---|---|---|
| 172,024 | Great Britain | Oct. 19, 1922 |